UNITED STATES PATENT OFFICE.

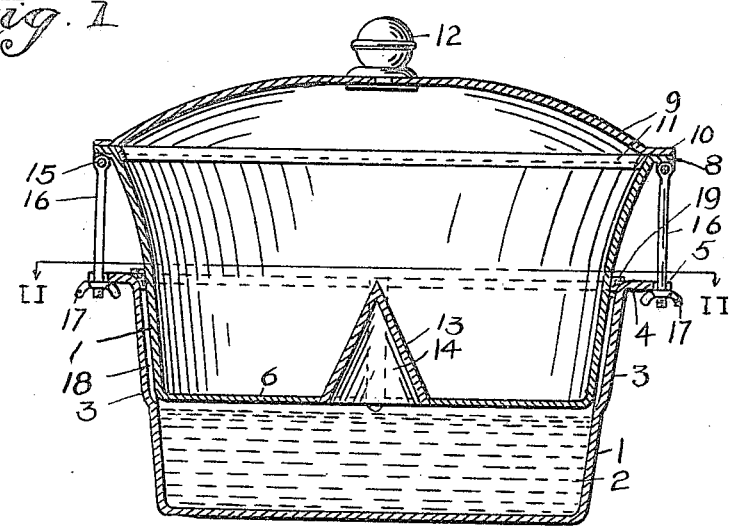
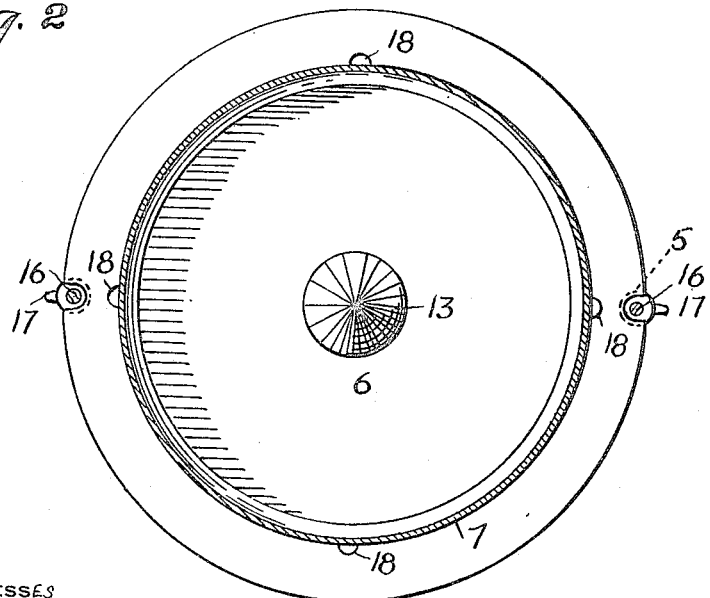

JOSEPH G. GAVLAK, OF MONONGAHELA, PENNSYLVANIA.

KITCHEN UTENSIL.

1,225,430.

Specification of Letters Patent.

Patented May 8, 1917.

Application filed August 3, 1916. Serial No. 112,938.

*To all whom it may concern:*

Be it known that I, JOSEPH G. GAVLAK, a citizen of the United States of America, residing at Monongahela city, county of Washington, and State of Pennsylvania, have invented certain new and useful Improvements in Kitchen Utensils, of which the following is a specification.

This invention relates to kitchen utensils, more particularly a dough raising device, and has for its object to provide a utensil of such class, in a manner as hereinafter set forth, which will enable the housewife to quickly raise a batch of dough so the same can be baked.

A further object of the invention is to provide a kitchen utensil for the purpose set forth including means whereby such utensil can be used for a vegetable steamer when desired.

Further objects of the invention are to provide a kitchen utensil which is simple in its construction and arrangement, strong, durable, efficient and convenient in its use, readily set up, and inexpensive to manufacture.

With the foregoing and other objects in view the invention consists of the novel construction, combination and arrangement of parts, as hereinafter more specifically described and illustrated in the accompanying drawing, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a vertical sectional view of a kitchen utensil for raising dough in accordance with this invention.

Fig. 2 is a sectional plan on line II—II, Fig. 1, looking in the direction of the arrows.

Referring to the drawings in detail 1 denotes an annular vessel which is termed a container and is adapted to receive a body of hot water. The side of the vessel 1 is offset at a plurality of points, as at 3, for a purpose to be presently referred to. The top of the container 1 is formed with an outwardly projecting peripheral flange 4, which is slotted at diametrically opposite points as at 5.

Adapted to extend within the container 1 is a dough receiving vessel comprising a bottom 6, and a body portion 7 which is provided at its upper end with an outwardly projecting peripheral flange 8. The body portion 7 is closed by a cover 9, having an outwardly projecting flange 10 and a depending flange 11 and further provided with a handle member 12. The bottom 6 of the dough receiving receptacle is formed with an upwardly extending hollow cone 13 which is struck from said bottom and forms a pocket 14. The flange 11 of the cover 9 is adapted to frictionally engage the inner face of the body portion 7 at the top thereof.

Pivotally connected to the flange 8, at diametrically opposite points, as at 15, are depending retaining bars 16, which are adapted to engage in the slots 5 and clamp with the flange 4 by the wing-nuts 17 which have threaded engagement with the lower ends of said bars 16. By this arrangement the dough receiving receptacle is connected with the container 1.

The body portion of the container 1 is tapering, as well as the body portion 7 of the dough receiving receptacle whereby when the body portion 7 is mounted in the body portion of the container 1 there is a frictional engagement therebetween.

The offset portions 3 form passages 18, for an outlet of steam when the utensil is employed for a vegetable steamer. When the utensil is employed for a dough raising device the upper ends of these passages are closed by plugs 19.

When using the utensil as a dough raising device hot water is poured into the container 1 and the heat therefrom will extend up into the pocket 14. The dough is placed about the cone 13 which spreads the same when the receptacle is closed. The heat from the water will quickly raise the dough and after the latter has been raised to the desired extent it is removed from the receptacle and baked.

What I claim is:—

1. A kitchen utensil comprising a tapering water container having a flat bottom, a tapering dough receiving receptacle having a portion permanently extended above the container and its other portion extending into and frictionally engaging with the inner face of the container, the bottom of said receptacle being flat and being spaced from the bottom of the container, said bottom of said receptacle provided centrally with an upwardly extending hollow cone closed at its apex and open at its base, a lid for closing said receptacle, said container having its bottom formed with diametrically opposed vertical offsets extending from the top edge and terminating above the bottom of a container, said offsets providing outlet passages for steam.

2. A kitchen utensil comprising a tapering water container having a flat bottom, a tapering dough receiving receptacle having a portion permanently extended above the container and its other portion extending into and frictionally engaging with the inner face of the container, the bottom of said receptacle being flat and being spaced from the bottom of the container, said bottom of said receptacle provided centrally with an upwardly extending hollow cone closed at its apex and open at its base, a lid for closing said receptacle, said container having its bottom formed with diametrically opposed vertical offsets extending from the top edge and terminating above the bottom of a container, said offsets providing outlet passages for steam, said container and said receptacle each having its top provided with a peripheral flange, said flanges materially spaced from each other, and means engaging with the flanges for coupling the container and the receptacle together.

In testimony whereof I affix my signature in the presence of two witnesses.

JOSEPH G. GAVLAK.

Witnesses:
JAMES B. HAYWARD,
TONY his × mark CHRISTINIA.

Copies of this patent may be obtained for five cents each, by addressing the "Commissioner of Patents, Washington, D. C."